(12) United States Patent
Rassin et al.

(10) Patent No.: US 9,141,341 B2
(45) Date of Patent: Sep. 22, 2015

(54) INVERSION OF CONTROL FOR EXECUTABLE EXTENSIONS IN A RUN-TIME ENVIRONMENT

(75) Inventors: Dmitry Rassin, Ashdod (IL); Amir Kibbar, Petah Tiqwa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 497 days.

(21) Appl. No.: 13/550,310

(22) Filed: Jul. 16, 2012

(65) Prior Publication Data

US 2014/0019983 A1 Jan. 16, 2014

(51) Int. Cl.
| | |
|---|---|
| *G06F 9/46* | (2006.01) |
| *G06F 9/44* | (2006.01) |
| *G06F 17/00* | (2006.01) |
| *G06F 9/445* | (2006.01) |
| *G06Q 10/06* | (2012.01) |

(52) U.S. Cl.
CPC .. *G06F 8/20* (2013.01); *G06F 8/30* (2013.01); *G06F 9/44526* (2013.01); *G06Q 10/06* (2013.01)

(58) Field of Classification Search
None
See application file for complete search history.

(56) References Cited

U.S. PATENT DOCUMENTS

| | | | |
|---|---|---|---|
| 8,185,555 B2 | 5/2012 | Carbajales et al. | |
| 8,365,068 B2 * | 1/2013 | Brandt et al. | 715/234 |
| 2002/0038450 A1 * | 3/2002 | Kloppmann et al. | 717/102 |
| 2009/0070786 A1 | 3/2009 | Alves et al. | |

OTHER PUBLICATIONS

Leicher et al., Integrating Container Services with Pluggable System Extensions, 5 th International Symposium on Distributed Objects and Applications, 2003.*
Qin et al., Towards Workflow Sharing and Reuse in the Askalon Grid Environment. In Proceedings of Cracow Grid Workshop (CGW'08), Cracow, Poland, Oct. 2008.*
"Deliver composite applications by orchestrating services derived non-intrusively from any application"; Technical White Paper; Website address: jacada.com/images/WhitePapers/pdfs/Fusion_White_Paper.pdf> , accessed Jun. 2012.
Moser; Master's Thesis—"VieDAME for WS-BPEL—A Non-Intrusive Dynamic Adaptation and Monitoring Solution for WS-BPEL based on Aspect Oriented Programming", Information Systems Institute, Distributed Systems Group, Technical University of Vienna, Feb. 7, 2008.
lnzinger et al.; "Non-Intrusive Policy Optimization for Dependable and Adaptive Service-Oriented Systems"; Proceedings of the 27th Annual ACM Symposium on Applied Computing, Mar. 25-29, 2012, pp. 504-510.

* cited by examiner

*Primary Examiner* — Meng An
*Assistant Examiner* — Bing Zhao
(74) *Attorney, Agent, or Firm* — Pearl Cohen Zedek Latzer LLP

(57) ABSTRACT

A system method and non-transitory computer readable medium implemented as programming on a suitable computing device, the system for inversion of control of executable extensions including a run-time environment configured to push data to one or a plurality of extensions, wherein said one or plurality of extensions are configured to comprise one or a plurality of signatures. Wherein said one or a plurality of extensions are compilable, designable and testable outside of the run-time environment, and wherein the run-time environment may be configured to accept an extension and to push data to that extension as per said one or a plurality of signatures.

20 Claims, 5 Drawing Sheets

INVERSION OF CONTROL FOR EXECUTABLE EXTENSIONS IN A RUN-TIME ENVIRONMENT

BACKGROUND

A workflow typically consists of a sequence of concatenated steps where each step is designed to follow the precedent step, in some examples, without delay or other gap and usually ends just before the subsequent step begins.

A workflow software application is a software application designed to, at least to some degree, automate a process or processes. Typically, the processes are business-related, but the workflow may be any process that requires a series of steps that can be automated via software. In some instances, steps within the workflow process may require human intervention, such as an approval. Some advanced workflow applications allow users to introduce new components into the operation.

A workflow application can typically be developed using many general-purpose programming languages, but in some instances, workflow applications that use specialized workflow languages also exist.

BRIEF DESCRIPTION OF THE DRAWINGS

Examples of the present invention are described in the following detailed description and illustrated in the accompanying drawings in which.

Figure 1:
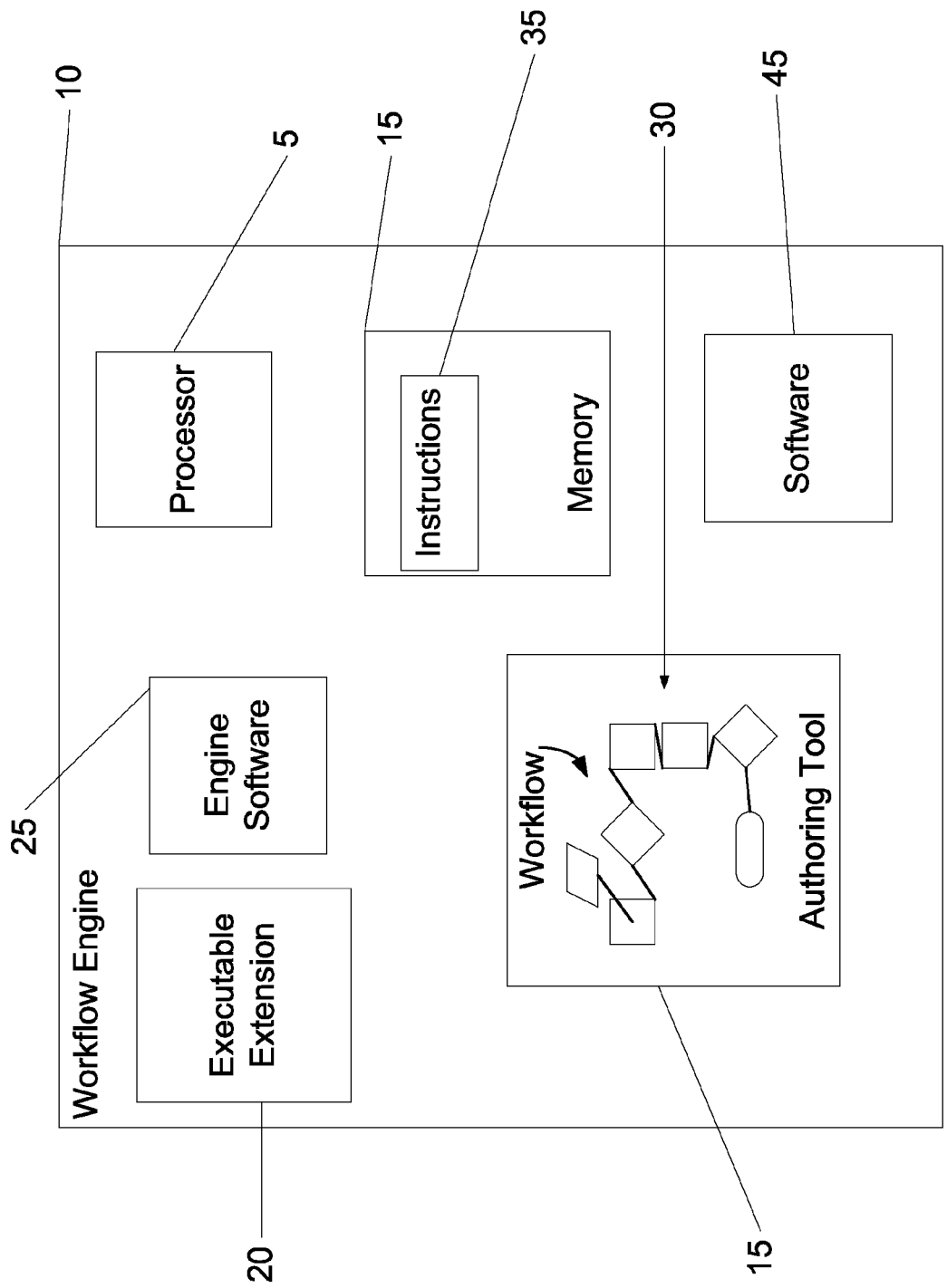
FIG. 1 depicts a schematic illustration of a workflow environment according to an example.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the methods and apparatus. However, it will be understood by those skilled in the art that the present methods and apparatus may be practiced without these specific details. In other instances, well-known methods, procedures, and components have not been described in detail so as not to obscure the present methods and apparatus.

Although the examples disclosed and discussed herein are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method examples described herein are not constrained to a particular order or sequence. Additionally, some of the described method examples or elements thereof can occur or be performed at the same point in time.

Unless specifically stated otherwise, as apparent from the following discussions, it is appreciated that throughout the specification, discussions utilizing terms such as "adding", "associating" "selecting," "evaluating," "processing," "computing," "calculating," "determining," "designating," "allocating" or the like, refer to the actions and/or processes of a computer, computer processor or computing system, or similar electronic computing device, that manipulate, execute and/or transform data represented as physical, such as electronic, quantities within the computing system's registers and/or memories into other data similarly represented as physical quantities within the computing system's memories, registers or other such information storage, transmission or display devices.

FIG. 1 depicts a schematic illustration of a workflow environment.

A workflow may be an end-to-end process designed to automate repetitive or low-skilled tasks. A workflow engine 10 may be a combination of hardware and of software instructions. The hardware may include a processor 5 and memory 15. Instructions 35 may be stored on memory, and, in some examples, may include one or a compilation of software programs, some programs described below. Workflow engine 10 may, in some instances provide process automation through automating tasks and processes in a data center using workflows that help information technology teams execute change with speed, quality, and consistency.

In some examples, a workflow end-to-end process may include an operating system health check, an integrated level one end-to-end level one incident management workflow, or other processes. The end-to-end process, e.g., a workflow, may include integration in other systems. A workflow may be configured to provide a logically linked sequence of steps, each step representing an operation. A flow can perform any task that may be programmed, on any computer anywhere on an intranet, extranet, or the Internet. For example, a flow may check to see whether a service is running, and if not, restart it.

In some instances, the workflow may be designed to include web-based, e.g., hyper-text transfer protocol (HTTP) automations, as well as other automations to automatically respond, diagnose, escalate, and/or remediate an issue. In some instances a workflow may be configured to outsource a potential problem outside of the workflow. Workflows may be configured to reduce mean time to recovery, reduce operational costs and/or increase agility.

In some examples, workflow engine 10 may provide the ability to automate mundane and repetitive tasks through providing a user-friendly visual operating environment to develop, build, execute and, in some instances, monitor workflows.

In some examples, workflow engine 10 may work with operating systems including Microsoft Windows, Red Hat and/or Suse Linux, Solaris and FreeBSD. Other platforms may also be used to run workflow engine 10. Workflow engine 10 may use Oracle, MS SQL servers or Sybase as a database for access to or inputs to data.

Workflow engine 10 may provide a platform for developing an automated workflow for automated server provisioning, e.g., building, monitoring, delivering and billing for a new server and integration into other systems. In some examples, the workflow may have a flow within a flow, e.g., a subflow, wherein each subflow, in some examples, includes one or more modules, plug-ins, or an executable extensions 20 or operations.

Workflow engine 10 may provide business service automation to a user. The business service automation may provide full or partial automation. Full or partial automation may be achieved by automating one or a plurality of devices that comprise the business service—across client, server, network, and storage.

Business Service Automation may be an integrated process that orchestrates changes, from simple tasks to end-to-end business service provisioning, across sets of tools and information technology domains.

In some examples, workflow engine 10 through a tight integration to management, automation, ticketing, and Configuration Management Data Base (CMDB) solutions—may automate end-to-end IT management processes by unifying the underlying technologies and teams in support of the business service In some instances, workflow engine 10 may provide automated service request fulfillments that may involve uses, additions, deletions, or changes around a user account, for example, through a self service portal. The portal may include user verifications, authentications, and writing to databases, among other systems.

In some examples, workflow engine 10 may include other software programs, e.g. a workflow authoring and deployment tool 15. Authoring and development tool 15 may include intuitive drag-and-wire capabilities to design, create, share, and customize flows with little or no programming skills.

In some instances, authoring and development tool 15 may support collaboration between multiple authors through version control capabilities. A built-in debugger may allow testing of workflows on multiple environments. The use of the built-in debugger may accelerate content development and enables validation of workflows for reliable execution.

Authoring and development tool 15 may be an intuitive and easy-to-use tool for authoring and designing workflows. Authoring and development tool 15 may provide visual representations of individual or groups of components and/or executable extensions 20 within a workflow, wherein each visual representation represents a executable extension 20 or other component that contains the technical know-how to complete one or a plurality of tasks within a workflow. In some examples, executable extension 20 may be a module or extension configured to be incorporated into a larger piece of software or a workflow 30.

Authoring and development tool 15 may be configured to connect different components of a workflow, and provide for one or more exits from the workflow. Authoring and development tool 15 may provide the ability for multiple users to access and view a workflow. Authoring and development tool 15 may be configured such that one or a plurality of users may have the ability to edit a workflow via the addition or subtraction of an executable extension 20 from the workflow.

Workflow engine 10 may include an engine software 25 used to run and manage flows. Engine software 25 may provide an interface to open, access and execute saved or user created workflows from a library. In some examples, workflow engine 10 may include over 3800 out-of-box operations, flows, and integration adapters. These included operations, modules and/or executable extensions and, in some instances, complete or partial workflows, may offer flexibility in terms of supporting many different platforms and products. In some examples, one or a plurality of comprehensive coverage of integration adapter for systems management products within workflow engine 10 may offer the freedom to use existing products without major tweaks or reprogramming.

In some examples, engine software 25 may request additional information from a user, in addition to the information provided in a workflow before a workflow can be executed. Engine software 25 may provide a visual representation of the running of the workflow before during or after the running of the workflow. Engine software 25 may also provide a detailed audit trail for each of the components and their results of the operations that the components were designed to carry out, the components shown typically those that were configured to be included in the workflow.

Workflow engine 10 may include a software program 45 or set of programs that may include prepackaged workflows, out-of-the-box integrations, and orchestration of multiple systems. In some instances a user may interact with a module and/or executable extension library that contains one or a plurality of executable extensions 20 to interact with the workflow engine 10. In some examples, a user may create their own executable extensions 20 to include in the workflow engine 10.

In some examples, workflow engine 10 may reduce operational cost with automation of common tasks and processes. Workflow engine 10 may, in some instances, improve service quality with accelerated incident resolution and/or reduce risk and errors during change execution. Workflow engine 10 may, in some examples, improve audit compliance through documentation generation and reporting and may integrate with current information technology environments to ensure a minimal impact on one or more procedures and one or more tools.

In some instances, a user may design, code and test executable extension 20. In some examples, this process of designing, coding and testing executable extension 20 may take place within the workflow engine 10 or run-time environment. In some examples, this process of designing, coding and testing executable extension 20 may take place outside the workflow engine 10 or run-time environment or other run-time environment.

After design, coding, compiling and/or testing, executable extension 20 may be incorporated into a workflow design process within authoring and development tool 15 and may become part of a workflow 30, designed within authoring and development tool 15. workflow 30 may be executed using engine software 25.

In some examples, workflow engine 10 may include other software suites as well or other software programs, in addition to those described above. Workflow engine 10 may be configured to include a run-time environment for one or a plurality of executable extensions 20, executable extensions 20 may be included within the components of workflow 30.

Figure 2:
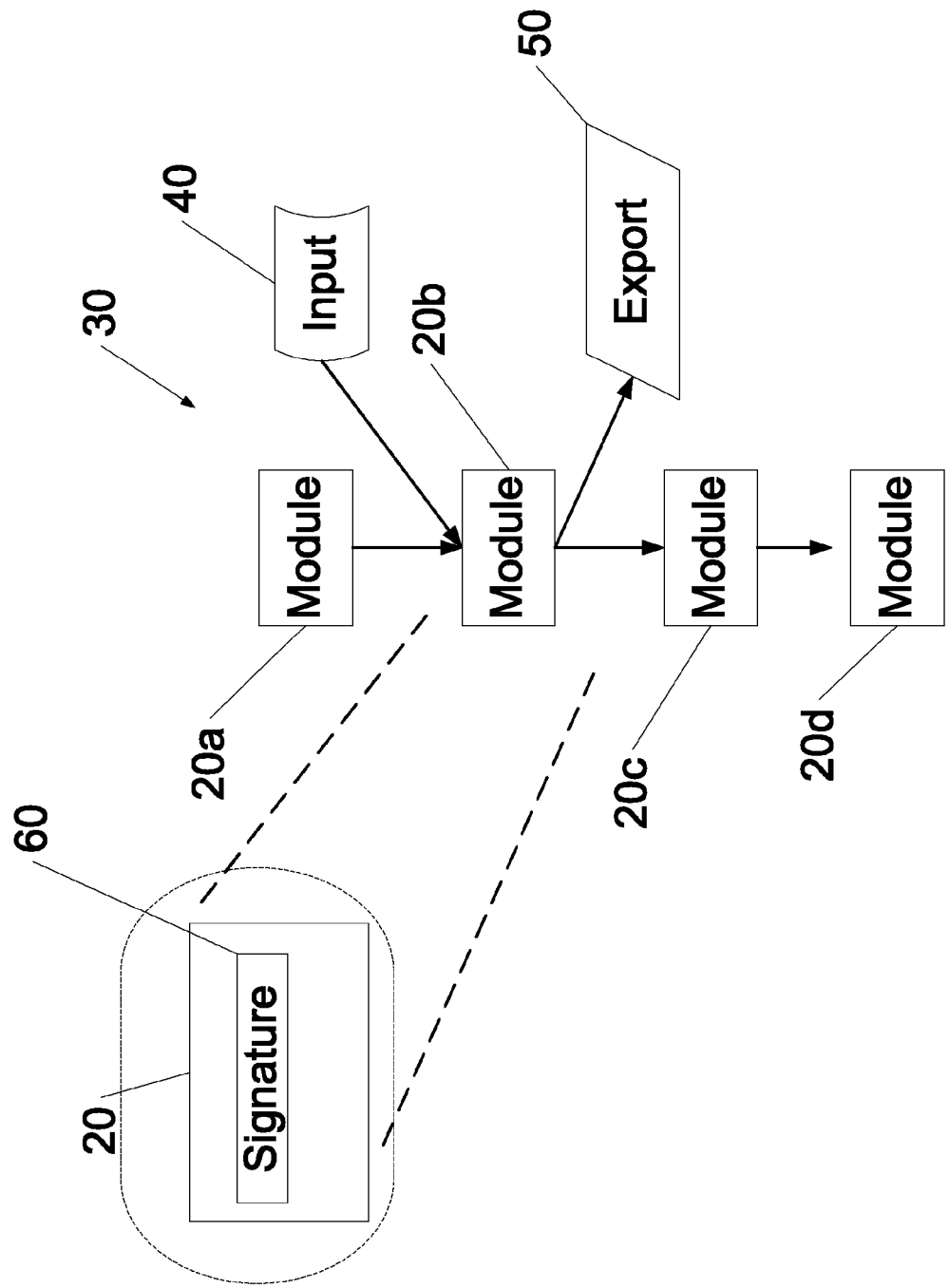
FIG. 2 is a schematic illustration of a workflow incorporating the use of inversion of control, according to an example.

FIG. 2 is a schematic illustration of a workflow incorporating the use of inversion of control, according to an example.

In some examples, there may be modules and/or plug-ins and/or executable extensions 20, here depicted as executable extensions 20a, 20b, 20c and 20d for illustrative purposes only. Other examples may have fewer or more executable extensions 20. Executable extension 20b may request one or more imports 40, e.g., data external to executable extension 20b, process the data, and output one or more exports 50, e.g., a data output. The output may be a further input within workflow 30, e.g., outputted to another executable extension 20, or may be outputted outside of workflow 30. In some examples, executable extension may be a component within a non-workflow environment.

In some examples, imports 40 may be described as a dependency such as data from databases, data from web services, data from third party components, file objects, web objects and other dependencies. Executable extension 20b may have a dependency if it depends on another object in order to execute executable extension 20b correctly, or may require the results of a previous operation to complete the operation coded in executable extension 20b.

Other executable extensions within workflow 30 may also be dependent on executable extension 20b, such that if executable extension 20 malfunctions, the workflow may get stuck or become aborted. In some instances, a change in a first executable extension 20b may force a ripple effect of changes to a second executable extension 20c and/or executable extension 20d or other executable extensions. In some examples, executable extensions 20 might have inter-executable extension dependencies.

Executable extension 20b may be incorporated into workflow engine 10. In some examples, a different workflow engine may be a large application that provides support for extensibility. The workflow engine may run, in some examples, a large, and/or in some instances, an unknown number of smaller components or executable extensions 20.

Workflow engine 10 may, in some examples, provide communication channels between executable extensions 20, without necessitating knowledge of the substance in executable extensions 20 or without anticipating specific needs of executable extensions 20.

Executable extensions 20b may be testable without needing to access the inputs 40 or write to the exports 50. In some examples, one or a plurality of executable extensions 20 may use a mock data-file or stub for testing thus allowing otherwise required dependencies such as database or other operations within workflow within the workflow 30 to be abstracted when testing executable extensions 20 with an alternative or different implementation of the dependency.

Executable extension 20b may also be pluggable into workflow engine without specifically encoding within executable extension 20b where one or a plurality of the dependencies are derived, where they are located, how to communicate with them or where exports 50 are sent. In some examples, the executable extension may be configurable from outside of the executable extension instead of configuring it from the inside via, in some instances, code. In some instances, workflow engine 10 may have code that is responsible for finding and interacting with import 40 for executable extension 20b, inverting a typical nature of control within a software program or suite.

Inversion of Control may be a style of software coding wherein the run time environment and/or workflow engine 10 controls some or all the execution of a module. In some examples, it may allow modules 20 and workflow engine 10 to be developed independently, decoupling the execution of task defined within module 20 from the implementation of the task by workflow engine 10. In some instances, termed: "Don't call us, we'll call you", inversion of control may invert a typical nature of control of integration and configuration of a module 20: taking the control of integration away from module 20 and providing that control to workflow engine 10 or a component external to module 20.

In some examples, executable extensions 20 may need to declare the imports 40 (e.g., dependencies) wherein workflow engine 10 can then locate and retrieve import 40 for executable extension 20, independent of the coding of executable extensions 20.

In some instances, one or a plurality of executable extensions 20 may be designed, coded and/or tested independent of the run-time environment of workflow engine 10.

In some examples, Workflow engine 10 may be designed to push information to executable extensions 20. In pushing the information, e.g., inputs 40 to executable extension 20, executable extension 20 does not need to know, a priori, where the information comes from, or how to specifically request the desired information. Workflow engine 10, or the run-time environment, may be configured to read a signature 60 within executable extension 20b, signature 60 describing the data required by executable extension 20b, and provides, i.e., pushes, that data to executable extension 20b.

Figure 3:
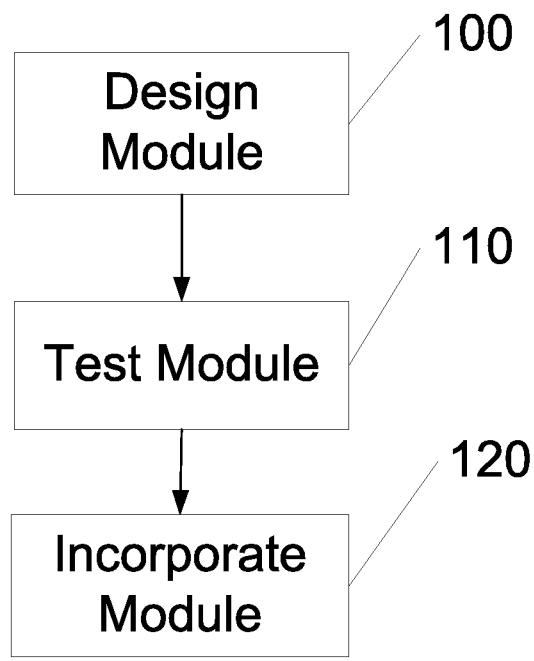
FIG. 3 is a schematic illustration of an implementation according to an example.

FIG. 3 is a schematic illustration of an implementation according to an example.

A user may, in response to a particular need within a workflow 30, create an executable extension 20. In some examples, a user may create executable extension 20 for use within a non-workflow environment, including for use in diagnostics, build systems, integrated development environment (IDEs), monitoring systems, discovery systems, and other environments.

Executable extension 20 may have dependencies external to executable extension 20. In some examples, these dependencies may reside in workflow engine 10. In some examples, the dependencies may reside external to the workflow engine 10 or another run-time environment in which executable extension 20 may be configured to run.

In some instances, executable extension 20b may need to output data or trigger a subsequent executable extension 20, e.g., executable extension 20c within workflow 30. Executable extension 20b may not need a priori information on where the information is going, or how to specifically relay the desired information to the location. Executable extension 20b may not need a priori information on how to trigger a subsequent executable extension to operate within workflow 30.

The user, in some examples, in response to a particular need may design and code and compile a particular executable extension 20b that may be configured to be incorporated into a workflow 30, as depicted in block 100. In some examples, the user may test executable extension 20, as depicted in block 110. In some instances, the user need not have access to workflow engine 10, or other run-time environments to test executable extension 20b. The user may not need access to the dependencies of executable extension 20 for testing. In some examples, user may use one or a plurality of stubs or mock data sets instead of a dependency to test executable extension 20b.

User may incorporate executable extension 20b into workflow 30, as depicted in block 120. In some examples, User may incorporate executable extension 20b into a non-workflow run-time environment. Workflow engine 10 may, in some instances find and provide dependencies, e.g., inputs 40 for executable extension 20b, as may be necessary as per details in a signature file, e.g. signature 60, or other file or method of communicating with workflow engine 10. The run-time environment may find and provide other dependencies for executable extension 20b, as may be necessary. Workflow engine 10 may, in some examples, take outputs 50 from executable extension 20b and apply them as directed by the signature file or based on other information provided by executable extension 20b to workflow 30.

Figure 4:
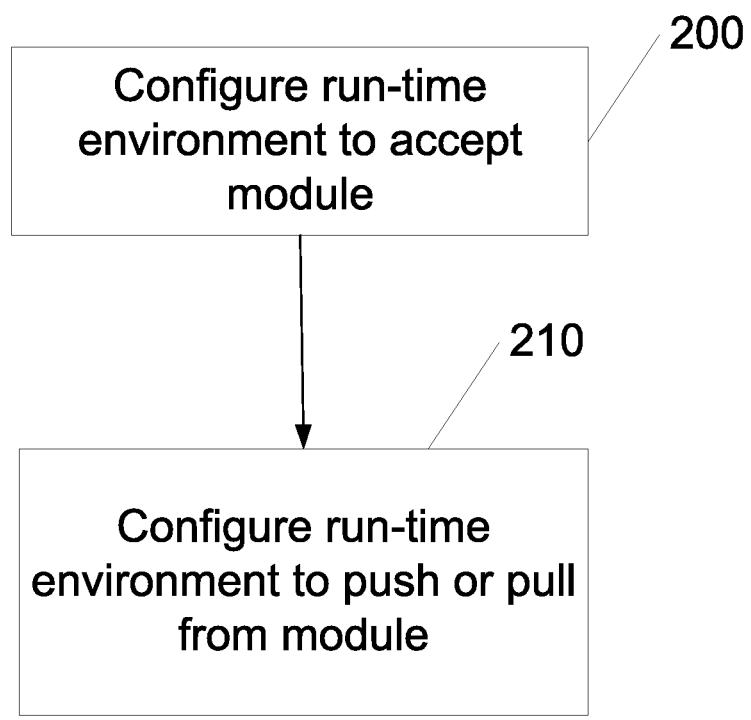
FIG. 4 is a schematic illustration of a method according to an example.

FIG. 4 is a schematic illustration of a method according to an example.

The method, in some examples, implemented as programming on a suitable computing device may include the running of a workflow 30, within a workflow engine, e.g., workflow engine 10. In some instances the method implemented as programming on a suitable computing device may include the running of software within a non-workflow run-time environment or other software.

Box 200 depicts the configuring of a run-time environment to push data, e.g., an input 40 to one or a plurality of extensions or executable extensions 20, e.g., executable extension 20b. In some examples, the one or plurality of extensions or executable extensions 20 configured to include one or a plurality of signatures.

The one or a plurality of extensions or executable extensions 20 may be able to be compiled—e.g., compilable, designable and testable out of process of the run-time environment e.g., workflow engine 10.

Box 210 depicts configuring the run-time environment, e.g., workflow engine 10 to accept any extension or executable extensions 20 and to push data, e.g., input 40 to that extension as per the one or plurality of signatures 60. In some examples, configuring the run-time environment, e.g., workflow engine 10 to accept or pull an output 50 from an extension or executable extensions 20 and push that output to its destination.

Figure 5:
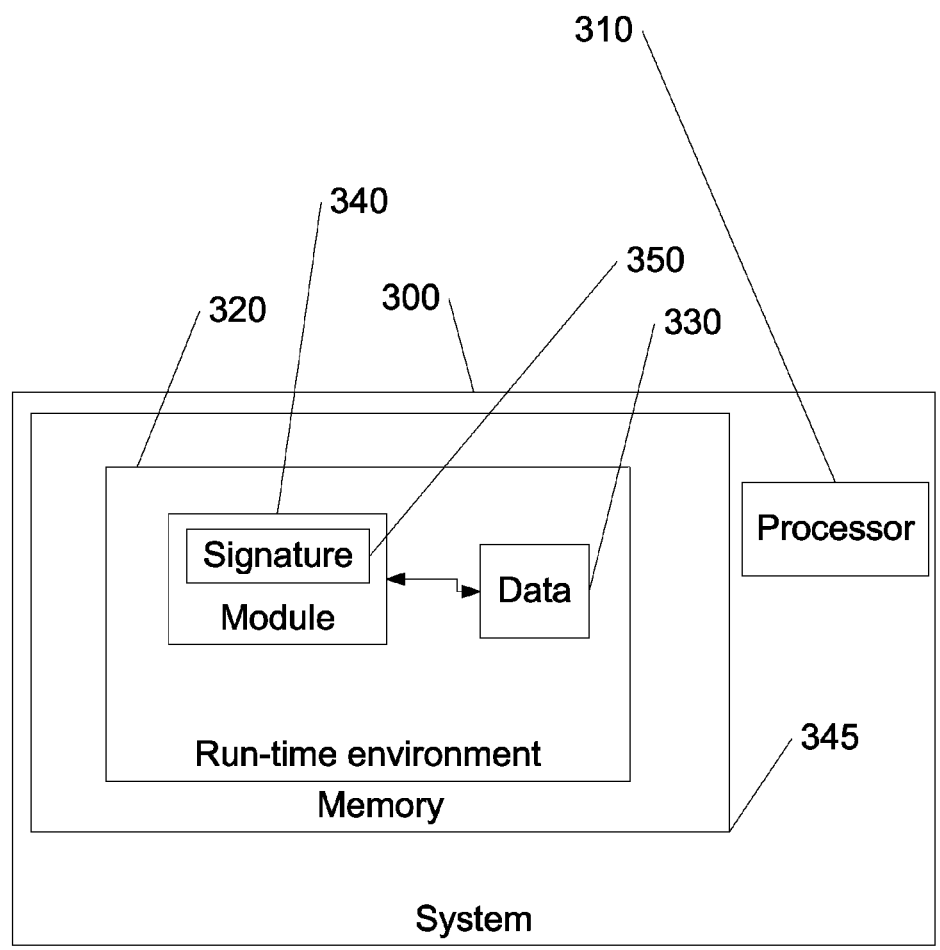
FIG. 5 is a schematic illustration of a system, according to an example.

FIG. 5 is a schematic illustration of a system, according to an example.

In some examples, a system 300 may be implemented as a workflow engine 10. Workflow engine may be a combination of hardware and software instructions. The hardware may include a processor 340 and memory 345. Memory may include additional programming on a suitable computing device or a processor 310. The system may include a run-time environment 320, the run time environment configured to push and/or pull data 330 to and/or from one or a plurality of extensions 340.

In some examples, the one or plurality of extensions 340 may be configured to include one or a plurality of signatures 350. Module or extension 340 may be compilable, designable and testable out of process of the run-time environment 320. Run-time environment 320 may be configured to accept any extension 340 and to push and/or pull data 330 to and/or from that extension as per the one or plurality of signatures 350.

Features of various examples discussed herein may be used with other embodiments discussed herein. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A system for inversion of control of executable extensions, implemented as a workflow engine, the system comprising a run-time environment including:
   a processor to execute the run-time environment; and
   an executable extension, comprising a first component of a workflow, wherein the extension was designed, compiled, and tested with dependency on the run-time environment,
   wherein the run-time environment is configured to:
      read a signature within the extension, wherein the signature describes first data to be used by the extension;
      push the first data from a database to the extension; and
      accept a new extension, comprising a second component of the workflow,
         wherein the new extension was designed, compiled, and tested independently of the run-time environment using a mock data-file or stub to provide the data described in the new signature, wherein the new extension includes a new signature,
         wherein the new extension is pluggable into the workflow without specific coding to define dependencies of the new extension, and
         wherein the dependencies of the new extension include at least another operation within the workflow;
      read the new signature, wherein the new signature describes second data to be used by the new extension; and
      push the second data from the database to the new extension.

2. The system of claim 1, wherein the run-time environment is configured to push one or a plurality of inputs to the extension and/or the new extension.

3. The system of claim 1, wherein the run-time environment is configured to take one or a plurality of outputs from the extension and/or the new extension.

4. The system of claim 1, wherein said run-time environment comprises a workflow.

5. The system of claim 1, wherein said run-time environment comprises an integrated development environment.

6. A method for inversion of control of executable extensions, implemented a workflow engine, the system comprising:
   reading a signature within an extension,
      wherein the extension comprises a first component of a workflow, that was designed, compiled, and tested with dependency on a run-time environment, and
      wherein the signature describes first data to be used by the extension; pushing the first data from a database to the extension accepting a new extension,
      wherein the new extension comprises a second component of the workflow that was designed, compiled, and tested independently of the run-time environment using a mock data-file or stub to provide the data described in the new signature,
      wherein the new extension is pluggable into the workflow without specific coding to define dependencies of the new extension, and
      wherein the dependencies of the new extension include at least a result of a previous operation;
   read the new signature, wherein the new signature describes second data to be used by the new extension; and
   pushing the second data from the database to the new extension.

7. The method of claim 6, including pushing one or a plurality of inputs to the extension and/or the new extension.

8. The method of claim 6, including taking one or a plurality of outputs from the extension and/or the new extension.

9. The method of claim 6, wherein the run-time environment comprises a workflow.

10. The method of claim 6, wherein said run-time environment comprises an integrated development environment.

11. A non-transitory computer readable medium comprising instructions, which when executed in a run-time environment cause a processor to:
   read a signature within an extension,
      wherein the extension comprises a first component of a workflow that was designed, compiled, and tested with dependency on the run-time environment, and
      wherein the signature describes first data to be used by the extension; push the first data from a database to the extension;

accept a new extension,
- wherein the new extension comprises a second component of the workflow that was designed, compiled, and tested independently of the run-time environment,
- wherein the new extension is pluggable into the workflow without specific coding to define dependencies of the new extension,
- wherein the new extension is configurable from outside of the new extension rather than being configurable from inside the new extension via code, and
- wherein the dependencies of the new extension include at least another operation within the workflow;

read the new signature, wherein the new signature describes second data to be used by the new extension; and push the second data from the database to the new extension.

12. The non-transitory computer readable medium of claim 11, wherein the run-time environment is configured to push one or a plurality of inputs to the extension and/or the new extension.

13. The non-transitory computer readable medium of claim 11, wherein the run-time environment is configured to take one or a plurality of outputs from the extension and/or the new extension.

14. The non-transitory computer readable medium of claim 11, wherein the run-time environment comprises a workflow.

15. The non-transitory computer readable medium of claim 11, wherein said run-time environment comprises an integrated development environment.

16. The medium of claim 11, wherein the new extension was designed, compiled, and tested independently of the run-time environment using a mock data-file or stub to provide the data described in the new signature.

17. The system of claim 1, wherein the dependencies of the new extension include at least the database.

18. The system of claim 1, wherein the dependencies of the new extension further include at least a result of a previous operation.

19. The system of claim 1, wherein the dependencies of the new extension further include at least a file object.

20. The system of claim 1, wherein the new extension is configurable from outside of the new extension rather than being configurable from inside the new extension via code.

* * * * *